United States Patent [19]
Tkatchenko

[11] 3,917,730
[45] Nov. 4, 1975

[54] NEW CATALYST FOR THE DIMERIZATION OF DIOLEFINS

[75] Inventor: Igor Tkatchenko, Pau, France

[73] Assignees: Union Chimique Elf-Aquitaine; Institut Francais du Petrole, des Carburants et Lubrifiants, both of Paris, France

[22] Filed: Oct. 10, 1973

[21] Appl. No.: 404,888

[30] Foreign Application Priority Data
Oct. 10, 1972  France .............................. 72.35766

[52] U.S. Cl..... 260/666 B; 260/666 PY; 252/431 C; 252/431 N; 252/438
[51] Int. Cl. .............................................. C07c 3/10
[58] Field of Search ................ 260/666 B; 252/438; 260/666 PY

[56] References Cited
UNITED STATES PATENTS

| | | | |
|---|---|---|---|
| 3,377,397 | 4/1968 | Maxfield ........................ | 260/666 B |
| 3,436,431 | 4/1969 | Caudlin et al. ................... | 260/666 B |
| 3,446,861 | 5/1969 | Menapace et al. ............... | 260/666 B |
| 3,446,862 | 5/1969 | Menapace et al. ............... | 260/666 B |
| 3,526,672 | 9/1970 | Boyer .............................. | 260/666 B |
| 3,542,887 | 11/1970 | Hillegass et al. ................. | 260/666 B |
| 3,655,793 | 4/1972 | Myers .............................. | 260/666 B |
| 3,660,342 | 5/1972 | Duggan ............................ | 260/666 B |

*Primary Examiner*—Veronica O'Keefe
*Attorney, Agent, or Firm*—Ostrolenk Faber Gerb & Soffen

[57] ABSTRACT

A liquid phase dimerization or codimerization of diolefins is effected by maintaining the diolefins in solution in an inert solvent in contact with a catalyst which is the product of the interaction between two metal complexes, each of which is a nitrosyl and/or carbonyl ligand, said interaction product containing at least one nitrosyl group.

9 Claims, No Drawings

NEW CATALYST FOR THE DIMERIZATION OF DIOLEFINS

BACKGROUND OF THE INVENTION

The manufacture of 4-vinyl cyclohexene (hereinafter called V$_4$CH) has been the object of substantial research for a long period of time. V$_4$CH is a material of prime interest because it can be easily dehydrogenated to produce styrene.

It has been known for some time that the specific dimerization of butadiene to V$_4$CH is possible by thermal means but this procedure requires a high temperature and the dimerization is slow. Additionally, a simultaneous polymerization occurs and competes with the desired Diels-Alder reaction.

Utilization of catalysts have been recommended to improve the speed of the butadiene dimerization. For example, catalyst systems constituted by complexes incorporating certain nitrosyl ligands alone or in association with certain carbonyl ligands, seem to be more active for dimerizing the diolefins. Thus, in British Pat. Nos. 1,085,875 and 1,148,177, the use of iron dinitrosyl dicarbonyl, ruthenium dinitrosyl dicarbonyl, cobalt dinitrosyl dicarbonyl, π-allyl iron nitrosyl dicarbonyl complexes are taught. However, these catalytic systems have a number of disadvantages. Their preparation requires two reaction steps starting from the metal carbonyl and they have the major disadvantage of being very volatile and being very toxic. When these catalysts are used, the dimerization reaction requires a temperature of at least 100°C. which causes a rapid deactivation of the catalyst. Additionally, a more or less long induction period is also required, which is not negligible from a yield point of view.

French Pat. No. 1,502,141 describes a catalytic system which has the advantage of accomplishing the dimerization of butadiene at a temperature as low as room temperature. This system is constituted by a halide of iron dinitrosyl in association with a donor compound and a reducer. Butadiene is quantitatively transformed to V$_4$CH at temperatures below 30° C. This disadvantage of this catalytic system is that it requires the use of an expensive reducer compound such as allyl magnesium bromide thereby decreasing industrial interest in this catalytic procedure.

French Pat. No. 1,535,936 teaches a catalytic system using compounds such as dihalo-bis-(π-allyl dinitrosyl iron) tin or germanium prepared in situ at temperatures of the order of 40° C. for dimerizing butadiene. This catalytic system also requires the use of organometallic compounds of tin or germanium which are expensive and most often toxic.

The present applicant has filed an application (Ser. No. 404,889) of even date herewith entitled "New Catalysts for the Dimerization of Diolefins" in which the catalyst is a complex of the ligand metal tricarbonyl nitrosyl ferrate type of the formula L$_p$M$^2$[Fe(CO)$_3$NO]$_n$. These catalysts are significant improvements over the prior art particularly with respect to the ease of preparation, cost, non-toxicity, ease of application and relatively low dimerization temperatures of about 60° C.

The present invention has the object of providing a new catalytic composition which possesses improved properties with respect to the catalytic systems described above, particularly with respect to a much greater reactivity. This and other objects of the invention will become apparent to those skilled in the art from the following detailed description.

SUMMARY OF THE INVENTION

This invention relates to a new catalytic process for the dimerization of diolefins and more particularly to a process using a catalyst which is the interaction product of two metal complexes, each of which is a nitrosyl and/or carbonyl ligand. The invention also relates to the new catalyst.

DESCRIPTION OF THE PREFERRED EMBODIMENTS

The new catalyst is the interaction product of two metal complexes, each of which contains a nitrosyl or carbonyl ligand, or both, and in which product there is at least one nitrosyl group.

The first metallic complex is a sodium n-carbonyl-p-nitrosyl metallate of the formula Na$_m$[M$^1$(CO)$_n$(NO)$_p$] and the second metallic complex is a r-carbonyl-s-nitrosyl halide of the formula X$_q$[M$^2$(CO)$_r$(NO)$_s$]. In these formulas, M$^1$ and M$^2$ are individually selected from the transition metals of Groups V-B, VI-B, VII-B and VIII of the Periodic Table appearing on pages 60–61 of Lange's Handbook of Chemistry (Revised 10th Edition); X is a mono- or divalent anion such as a halogen, e.g., fluorine, chlorine, bromine and iodine, or a pseudo-halogen, e.g., cyanide, sulfocyanide, isocyanate, nitrate, nitrite, sulfate, acetylacetonate, carboxylate, or the like; m and q are each integers of 1–5; n, p, r and s are each integers of 0–5, where the sum of n + p and the sum of s + r are usually equal to 1–6 and where p and s cannot simultaneously be 0. Each complex can, if desired, be a mixture of complexes of the particular formula.

The catalyst is thus the product of the reaction qNa$_m$[M$^1$(CO)$_n$(NO)$_p$] + mX$_q$[M$^2$(CO)$_r$(NO)$_s$].

As examples of compounds of the formula Na$_m$[M$^1$(CO)$_n$(NO)$_p$] there can be cited: sodium tricarbonyl nitrosyl ferrate (Na[Fe(CO)$_3$NO]), sodium tetracarbonyl cobaltate (Na[Co(CO)$_4$]), sodium tetracarbonyl ferrate (Na$_2$[Fe(CO)$_4$]), sodium pentacarbonyl manganate (Na[Mn(CO)$_5$]), and similar compounds.

Among compounds of the formula X$_q$[M$^2$(CO)$_r$(NO)$_s$], there can be mentioned iron nitrosyl halide ([Fe(NO)$_2$X]), cobalt dinitrosyl halide ([Co(NO)$_2$X]), nickel nitrosyl halide ([Ni(NO)X]), iron tetracarbonyl dihalide ([Fe(CO)$_4$X$_2$]), manganese pentacarbonyl chloride ([Mn(CO)$_5$Cl]), and the like. Other compounds where the ligand carbonyls or nitrosyls have been partially substituted by other ligands can also be used, such as, for example, π-C$_3$H$_5$[Fe(CO)$_3$X], [Fe(-NO)$_2$LX], [Co(NO)$_2$LX], [Mn(CO)$_3$L$_2$X], [Fe(-CO)$_2$L$_2$X$_2$], Na[Co(CO)$_2$L$_2$], K$_2$[Fe(NO)$_2$(CN)$_2$] in which L is a chalcogen or pnicogen ligand. A compound without either a nitrosyl or carbonyl ligand cannot be used even when the other partner in the reaction retains the nitrosyl ligand and obtain the results of this invention.

The catalyst of this invention can be simply prepared by mixing each of the constituents in solution or in suspension. The same inert solvents as used in the dimerization reaction can conveniently be used. Generally, the mixture is brought to a slightly elevated temperature, generally about 30°–70° C., and is maintained under agitation for a time sufficient to allow the reaction, usually about 0.5 to 5 hours and conveniently about 1 hour.

The ratio of the two components of the catalytic system can vary within large limits, e.g., 10:1 to 1:10. Best results are obtained when the ratio corresponds to that of the stoichiometric equation $q/m$, i.e., 5:1 to 1:5.

The catalyst thus prepared possesses a number of remarkable properties. For example, its reactivity does not require any significant activation period.

In a preferred embodiment, the catalyst of this invention is prepared in situ and the reaction mixture is used as such without isolating the catalyst compound per se.

The diolefin dimerization is effected by mixing a catalytic amount of the catalyst with the diolefin mixture. The catalytic amount varies over a wide range, e.g., up to about 10 weight per thousand, although an amount of catalyst of the order of about 1 weight per thousand of the diolefin is preferred. The reaction is effected in a pressure vessel under pressure conditions sufficient to maintain the reaction medium liquid. The pressure utilized can vary considerably depending on the particular catalyst, diolefin, solvents, amounts of materials, etc., but is generally in the range of about 5 kg/cm² and preferably about 3 kg/cm².

The dimerization temperature can vary between 0°–100° C., preferably about 20°–70° C., depending on the diolefin being dimerized. One of the remarkable characteristics of this catalyst is that it possesses a very great activity. At room temperature, i.e., about 20°–30° C., butadiene can be dimerized to $V_4CH$ quantitatively. Other diolefins, for example, containing up to about 10 carbon atoms, such as isoprene, norbornadiene, $C_4$ fraction of butadiene-butenes require a temperature of the order of 40°–60° C., but the reaction time is much longer than with catalytic systems of the prior art.

Solvents used in the inventive process should, of course, be inert with respect to the catalyst. Solvents which can be used include saturated aliphatic and cycloaliphatic hydrocarbons such as hexane and cyclohexane, halogenated saturated hydrocarbons such as dichloroethane, aromatic hydrocarbons and halogenated aromatic hydrocarbons such as benzene, toluene and chlorobenzene, aliphatic, aromatic and cyclic ethers such as tetrahydrofuran, and the like. The intended product, e.g., $V_4CH$, as well as the diolefin dimers can be used as the solvent; such utilization has the advantage of permitting the recovery of the $V_4CH$ by a simple distillation without the need of separating the solvent.

The catalytic system of the present invention is especially appropriate in dimerizing butadiene in vinylcyclohexene and results in a practically quantitative yield. Nonconjugated diolefins such as norbornadiene can equally be dimerized.

Another particular trait of the present invention is that the catalyst permits selective dimerization of the diolefin in diolefin-monoolefin mixtures. The monoolefin is unchanged after the dimerization process and separation of the dimer and the monoolefin is very easy.

One particularly interesting application of the catalyst of this invention is in treating fractions of hydrocarbons obtained in the refinery which contain mixtures of diolefins and monoolefins. Thus, for example, the $C_4$ fraction which contains a mixture of butadiene and butenes can be treated to obtain a total conversion of butadiene to $V_4CH$ with a selectivity of 100%. It is much easier to separate the $V_4CH$ from the non-dimerized butenes than to separate butadiene from the butenes. This aspect of the invention is, therefore, particularly significant from an economic point of view.

In the following Examples, the experiments were carried out in a 125 ml stainless steel autoclave provided with a double liner for thermostatic control. In each case, the autoclave was cooled to −20° C. under a nitrogen atmosphere and a predetermined quantity of a sodium salt of the complex anion in toluene suspension or another solvent mentioned above plus a predetermined quantity of the second complex was added, and a given weight of the desired diene was added. The $C_4$ fraction used in these Examples had approximately 35–45% butadiene and 65–55% butenes. The autoclave was then heated to the desired temperature and agitated for a given period of time. At the end of the dimerization, the catalyst was deactivated by introducing hydrochloric acid to the autoclave and by bubbling air therethrough. The reaction mixture thus obtained was distilled for separation of the solvent and the different products were examined and identified by vapor phase chromatography.

EXAMPLES 1–3

The catalytic system was prepared directly in the autoclave, cooled to −20° C., by introducing a suspension of 193 mg (1 mmole) of sodium tricarbonyl nitrosyl ferrate in 5 ml of toluene, and a solution of 199 mg (1 mmole) of cobalt dinitrosyl bromide in 5 ml of toluene. These complexes, and in general complexes of the type $[Co(NO)_2X]$ can be prepared in a toluene solution according to methods described in the literature. 16.2 g (300 mmole) of liquid butadiene were added and the autoclave was heated to the dimerization temperature for 5 hours. The reaction mixture was then treated with dilute hydrochloric acid to deactivate the catalyst. The solvent was distilled off and the remaining product analyzed. Table I shows that at a temperature of 20° C., the conversion is practically complete, and the selectivity is 100%. In order to have a total conversion, a temperature of 40° C. is sufficient. A higher temperature is not necessary.

TABLE I

| | Catalyst System $Na[Fe(CO)_3NO] + [Co(NO)_2Br]$ | | |
|---|---|---|---|
| Example | Temp. °C. | Conversion % | Selectivity % |
| 1 | 20 | 99.5 | 100 |
| 2 | 40 | 100 | 100 |
| 3 | 60 | 100 | 100 |

EXAMPLES 4–5

In the −20° C. autoclave, 1 mmole of $Na_m[M^1(CO)_4]$ as 194 mg of sodium tetracarbonyl cobaltate (Example 4) or 108 mg of sodium tetracarbonyl ferrate (Example 5), plus a solution of 199 mg (1 mmole) of cobalt dinitrosyl bromide in 5 ml of toluene were introduced. 16.2 mg of liquid butadiene is added to the autoclave and the reaction is run for 3 hours at 40° C. The reaction mixture is treated as in the previous Examples and the results are given in Table II.

TABLE II

| | Catalyst System $Na_m[M^1(CO)_4] + [Co(NO)_2Br]$ | | |
|---|---|---|---|
| Example | Sodium Salt | Conversion % | Selectivity % |
| 4 | $Na[Co(CO)_4]$ | 99 | 100 |
| 5 | $Na_2[Fe(CO)_4]$ | 99 | 100 |

EXAMPLES 6-8

Following the procedure set forth in the previous Examples, a catalyst was prepared using 1 mmole of the sodium complex set forth in Table III below and 1 mmole of iron dinitrosyl iodide (in place of the cobalt dinitrosyl bromide utilized in Examples 1-5). 16.2 g of liquid butadiene was added to the autoclave and dimerized at 40° C. for 3 hours. The results are indicated in Table III.

TABLE III

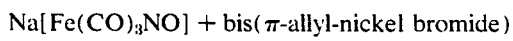

| Example | Catalyst System $Na_m[M^1(CO)_n(NO)_p] + [Fe(NO)_2I]$ Sodium Salt | Conversion % | Selectivity % |
|---|---|---|---|
| 6 | $Na[Fe(CO)_3NO]$ | 99 | 100 |
| 7 | $Na[Co(CO)_4]$ | 99 | 100 |
| 8 | $Na_2[Fe(CO)_4]$ | 99 | 100 |

The same results were obtained when the amount of sodium complex was reduced to 0.5 mmole.

EXAMPLE 9

$Na[Fe(CO)_3NO]$ + bis($\pi$-allyl-nickel bromide)

A catalyst system was prepared by mixing 1 mmole of sodium tricarbonyl nitrosyl ferrate and 0.5 mmole of bis($\pi$-allyl nickel bromide), each suspended in 5 ml of toluene. The procedure of the foregoing Examples was followed exactly to obtain an 85% conversion of the butadiene which resulted in a mixture of 86% of $V_4CH$, 13% of 1,5-cyclooctadiene and 1,5,9-cyclododecatriene.

This Example shows that when the second complex contains neither a nitrosyl group nor carbonyl group, but is an $\pi$-allylic compound of nickel, the conversion and selectivity in $V_4CH$ is significantly less than when using a catalyst in which each of these compounds contains a nitrosyl or carbonyl ligand.

EXAMPLE 10

Catalyst System $Na[Fe(CO)_3NO] + [Fe(CO)_4Br_2]$

A mixture of 1 mmole of sodium tricarbonyl nitrosyl ferrate in 5 ml of toluene and 0.5 mmole of iron tetracarbonyl dibromide in 5 ml of toluene was placed in the autoclave followed by the addition of 16.2 g of liquid butadiene. The autoclave was heated to 60° C. and maintained at that temperature for 5 hours and the product was treated as in the previous Examples. The conversion to $V_4CH$ was 95% and the selectivity was 100%.

EXAMPLE 11

Dimerization of Isoprene

The catalyst system giving the best results for the dimerization of butadiene, i.e., that of Examples 1-3, was used. 300 mmole (20.4 g) of isoprene was added and the reaction mixture was maintained at 60° C. for 3 hours. After treating the reaction product as in the previous Examples, dimers of isoprene were obtained. The conversion was 99.5% and the selectivity was 100%.

EXAMPLE 12

Codimerization of Butadiene and Isoprene

To an autoclave containing the catalyst system of Examples 1-3, an equimolar mixture of butadiene (150 mmole) and isoprene (150 mmole) were added and the autoclave was maintained at 60° C. for 3 hours. The reaction product was worked up as in the previous Examples and the conversion for butadiene was 100% and the conversion of isoprene was 99%.

EXAMPLE 13

Dimerization of Butadiene in a $C_4$ Fraction

The catalyst system of Examples 1-3 was introduced into the autoclave (cooled to $-20°$ C.) and 20 g of a steam cracked $C_4$ fraction containing 38% butadiene was added. The autoclave was then heated and maintained at 60° C. for 5 hours. After isolating the products, it was ascertained that 96% of the butadiene in the $C_4$ fraction was transformed to $V_4CH$ and the selectivity was 100%.

EXAMPLE 14

Norbornadiene Dimerization 1 mmole of the catalyst of Examples 1-3 was introduced into the autoclave and 15 g of bicyclo-[2,2,1]-heptadiene (norbornadiene) was added. The mixture was maintained at 85° C. for 3 hours. The catalyst was deactivated with dilute hydrochloric acid and the solvent was distilled off. It was found that 99% of the norbornadiene was converted to dimers.

Various changes and modifications can be made in the catalyst and process of the present invention without departing from the spirit and the scope thereof. The various embodiments set forth herein were for the purpose of further illustrating the invention but were not intended to limit it.

I claim:

1. A process for the dimerization of diolefins of up to about 10 carbon atoms in liquid phase which comprises contacting said diolefin in solution in an inert solvent at a temperature between 0°-100° C. with a dimerization catalytic amount of up to about 1 weight percent of a catalyst which is the interaction product of a first and a second metallic complex, each of said complexes containing at least one of nitrosyl and carbonyl ligands and said interaction product containing at least one nitrosyl group, wherein said first metallic complex is a sodium n-carbonyl-p-nitrosyl metallate of the formula $Na_m[M^1(CO)_n(NO)_p]$, in which $M^1$ is a transition metal of Group VB, VIB, VIIB or VIII of the Periodic Table, $n$ and $p$ are integers of 0-5, the sum of $n + p$ is 1-6, and m is an integer of 1-5, and wherein said second metallic complex is a r-carbonyl-s-nitrosyl halide of the formula $Xq[M^2(CO)_r(NO)_s]$ in which $M^2$ is a transition metal of Groups VB, VIB, VIIB or VIII of the Periodic Table, X is halogen, cyanide, sulfocyanide, isocyanate, nitrate, nitrite, sulfate, acetylacetonate or carboxylate, $r$ and $s$ are integers of 0-5, $q$ is an integer of 1-5, the sum of $r + s$ is 1-6, and wherein $p$ and $s$ are not simultaneously 0.

2. The process of claim 1 wherein said first metallic complex is selected from the group consisting of sodium tricarbonyl nitrosyl ferrate, sodium tetracarbonyl cobaltate, and sodium tetracarbonyl ferrate and wherein said second metallic complex is selected from the group consisting of dinitrosyl cobalt bromide, dinitrosyl iron iodide and tetracarbonyl iron bromide.

3. The process of claim 2 wherein said dimerization temperature is between 20°-70° C.

4. The process of claim 1 wherein said catalytic amount is about 0.1 weight percent.

5. The process of claim 1 wherein said diolefin is butadiene.

6. The process of claim 1 wherein said diolefin is selected from the group consisting of isoprene, norbornadiene and a refinery $C_4$ fraction containing butadiene and butenes.

7. The process of claim 1 wherein butadiene and isoprene are copolymerized.

8. The process of claim 1 wherein the ratio of said first metallic complex to said second metallic complex is q/m.

9. The process of claim 1 wherein said catalyst is selected from the group consisting of the interaction product of a. sodium tricarbonyl nitrosyl ferrate and dinitrosyl cobalt bromide,
b. sodium tetracarbonyl cobaltate and dinitrosyl cobalt bromide,
c. sodium tetracarbonyl ferrate and dinitrosyl cobalt bromide,
d. sodium tricarbonyl nitrosyl ferrate and dinitrosyl iron iodide,
e. sodium tetracarbonyl cobaltate and dinitrosyl iron iodide,
f. sodium tetracarbonyl ferrate and dinitrosyl iron iodide, and
g. sodium tricarbonyl nitrosyl ferrate and tetracarbonyl iron bromide.

* * * * *